United States Patent [19]

Westby

[11] Patent Number: 4,589,956
[45] Date of Patent: May 20, 1986

[54] CONDENSATION HEATING FACILITY CONTROL SYSTEM

[75] Inventor: George R. Westby, Batavia, Ill.

[73] Assignee: GTE Communication Systems Corporation, Northlake, Ill.

[21] Appl. No.: 606,006

[22] Filed: May 2, 1984

[51] Int. Cl.$^4$ .............................................. B01D 3/00
[52] U.S. Cl. ..................... 202/170; 202/186; 159/43.2; 159/44; 203/1; 203/2; 203/DIG. 18; 228/102
[58] Field of Search ............... 202/170, 186, 181, 160; 203/1, 2, 87, DIG. 7, DIG. 18; 134/10–12, 57 R, 106, 108, 186; 228/102, 242; 159/44, 43.2; 62/238.5; 137/567

[56] References Cited

U.S. PATENT DOCUMENTS

| | | | |
|---|---|---|---|
| 3,000,795 | 9/1961 | Goeldner | 202/160 |
| 3,357,359 | 12/1967 | Schaub | 137/567 |
| 3,786,835 | 1/1974 | Finger | 137/567 |
| 3,872,887 | 3/1975 | Wohlrab | 137/567 |
| 3,904,102 | 9/1975 | Chu et al. | 202/170 |
| 4,055,217 | 10/1977 | Chu et al. | 165/1 |
| 4,077,467 | 3/1978 | Spigarelli | 202/170 |
| 4,096,039 | 6/1978 | Carnine | 202/160 |
| 4,289,586 | 9/1981 | Sabatka | 202/170 |
| 4,556,456 | 12/1985 | Ruckriegel et al. | 203/21 |

Primary Examiner—Wilbur Bascomb
Attorney, Agent, or Firm—Robert J. Black; Gregory G. Hendricks

[57] ABSTRACT

A control system for use in a condensation heating facility to control the secondary vapor blanket used to prevent loss of primary vapor. The control system includes a pair of secondary vapor sensors which detect a secondary vapor blanket slightly below and alternatively slightly above a design depth. The sensors are connected to control relays which energize a high rate dispensing pump to build the secondary vapor blanket when it is below the low depth and to energize a low rate dispensing pump when the secondary vapor blanket is between the low depth and the high depth. Additional control is arranged to inhibit dispensing of secondary liquid when the secondary vapor blanket is above the high depth or the primary vapor blanket is below its designed depth or finally during a vapor phase heating cycle where the primary and secondary vapor blankets collapse as a function of heating during the cycle.

16 Claims, 1 Drawing Figure

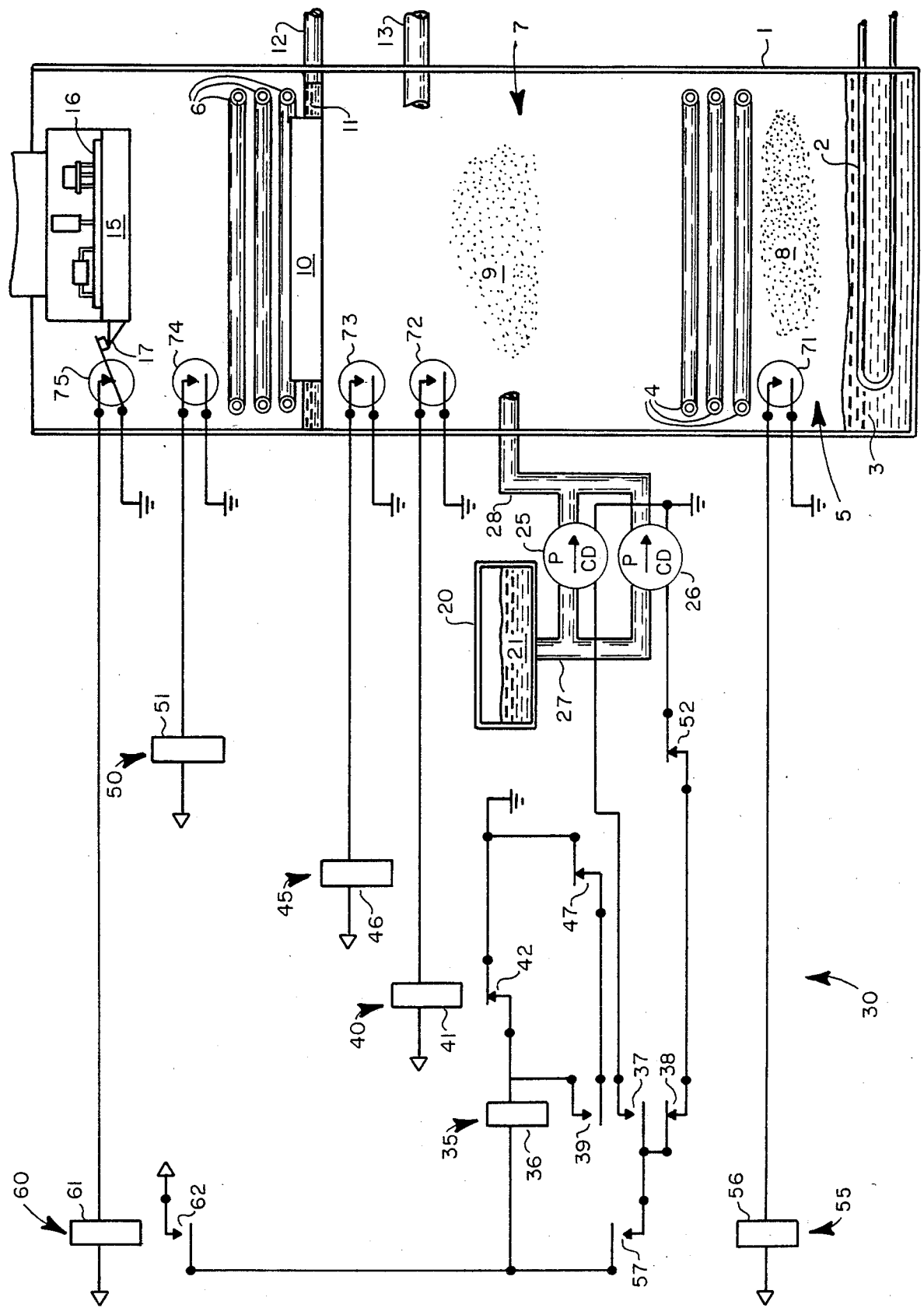

CONDENSATION HEATING FACILITY CONTROL SYSTEM

BACKGROUND OF THE INVENTION

The present invention relates to condensation heating facilities and, more particularly, to a system for regulating a blanket of secondary vapor in a vessel open to the atmosphere and containing a primary vapor shielded from the atmosphere by the secondary vapor.

Condensation heating facilities employing a secondary blanket of vapor to shield a primary blanket of vapor from the atmosphere are very well known to those skilled in the art. Two such systems are taught in U.S. Pat. No. 3,904,102 issued Sept. 9, 1975, to Tze Yao Chu, et al; and U.S. Pat. No. 3,947,240, issued Mar. 30, 1976, to Robert C. Pfahl, Jr. The cited patents teach maintenance of a secondary blanket by the continuous condensation of secondary vapor on an outer surface of a cooling coil, collection of the condensate in a trough from which it is drained off and reintroduced into a primary trough where it is boiled to reproduce secondary vapor. Compensation for loss of secondary vapors to the atmosphere is accomplished by feeding makeup secondary liquid from a reservoir to the primary trough via a line controlled by a control valve. The valve may be variously operated by sensors detecting a drop in the level of the top of the secondary vapor body or by sensors detecting changes in the secondary vapor concentration in the upper portion of the vessel. Such an arrangement while operating generally satisfactorily has been found to be difficult to control accurately resulting in oscillating periods of excessive and deficient secondary vapor within the vessel.

Another method of secondary vapor blanket control is taught by U.S. Pat. No. 4,055,217, issued Oct. 25, 1977, to Tze Yao Chu, et al; and its divisional U.S. Pat. No. 4,090,843, issued May 23, 1978, to the same inventors. In accordance with the cited patents, secondary vapor blanket control is achieved by condensing the secondary vapor on a cooling coil, collecting the condensate in a trough and siphoning the trough condensate into a reservoir containing secondary vapor liquid. The secondary liquid is then pumped from the storage tank through a line and onto a wick located in the body of secondary vapor and extending downward to a point proximate the primary vapor interface. As the secondary vapor liquid travels downward through the wick it is heated and vaporizes to form supplementary secondary vapor thus maintaining the vapor blanket. Such, an arrangement while operating generally satisfactorily requires an array of spray nozzles for even distribution of the secondary vapor liquid and working material located within the vapor phase heating vessel.

SUMMARY OF THE INVENTION

A regulating system is provided in accordance with the present invention which avoids the disadvantages of secondary vapor blanket regulating systems as described hereinabove. The regulating system in accordance with the present invention includes a vessel open to the atmosphere and adapted to contain therein a body of hot saturated primary vapor and a blanket of secondary vapor interposed between the atmosphere and the primary vapor, the blanket of secondary vapor subject to loss through dispersion to the atmosphere. The regulating system also includes a reservoir of secondary liquid, sensors located within the vessel, first dispensing apparatus connected between the reservoir and the vessel and operated to conduct the secondary liquid into the vessel at a first predetermined rate to establish the blanket of secondary vapor, and second dispensing apparatus connected between the reservoir and the vessel and operated to conduct the secondary liquid into the vessel at a second predetermined rate to maintain the blanket of secondary vapor. Control apparatus is included and connected to the first dispensing apparatus, to the second dispensing apparatus, and to the sensing apparatus. The control apparatus is operated in response to a first condition of the secondary vapor detected by the sensing apparatus to energize the first dispensing apparatus and alternatively operated in response to a second condition of the secondary vapor detected by the sensing apparatus to energize the second dispensing apparatus.

BRIEF DESCRIPTION OF THE DRAWING

The condensation heating facility regulating system of the present invention will be better understood from the following description taken in conjunction with the accompanying single FIGURE drawing depicting the regulating system of the subject invention.

DESCRIPTION OF THE PREFERRED EMBODIMENT

Referring now to the drawing, there is shown a condensation heating facility regulating system in accordance with the present invention. As shown in the FIGURE, the regulating system includes vessel 1 open to the atmosphere at its upper end and including heating apparatus 2 located in the bottom of the vessel 1 for the purpose of heating a body of primary liquid 3. A set of primary vapor condensing coils 4 is included within the vessel 1 at a distance above the primary liquid 3, the area between the primary vapor condensing coil 4 and the primary liquid 3 defining therebetween a primary vapor area 5. A set of secondary vapor condensing coils 6 is also included within the vessel 1 at a distance above the primary vapor condensing coils 4 defining therebetween a secondary vapor area 7. The primary vapor area 5 is adapted to contain a blanket of primary vapor 8 and the secondary vapor area 7 is adapted to contain a blanket of secondary vapor 9.

A secondary liquid trough 10 is provided within the vessel 1 immediately below the secondary vapor condensing coils 6 and is adapted to receive a secondary vapor condensate 11 therein. A drain conduit 12 is provided to convey the condensate 11 which has collected within the trough 10 to a point outside the vessel 1 and an admitting conduit 13 is provided to convey the secondary condensate 11 into the vessel 1 from a point outside of the vessel 1. The conduits 12 and 13 may be connected directly together or optionally, as known by those skilled in the art, apparatus (not shown) may be included between the conduits 12 and 13 to clean and condition the secondary vapor condensate before returning it to the vessel 1 for vaporization.

An elevator 15 is included to convey an assembly to be soldered 16 down into the vessel 1 wherein the vapor phase heating process takes place. The elevator 15 includes an actuator arm 17.

A reservoir 20 including a makeup secondary liquid 21 is provided to supply secondary liquid to the vessel 1. A high rate dispensing pump 25 and a low rate dispensing pump 26 are included to inject the makeup secondary liquid 21 into the vessel 1 at a controlled rate. The pumps 25 and 26 are connected to the reservoir 20 by a conduit 27 and to the vessel 1 by a conduit 28. The pumps 25 and 26 may be of any type known to those skilled in the art as for example, pumps of the electrically driven piston type which is preferably employed in the subject invention.

A control module 30 is provided including a first relay 35 having a coil 36, a first set of normally open contacts 37, a second set of normally closed contacts 38 and a third set of normally open contacts 39, a second relay 40 including a coil 41 and a first set of normally closed contacts 42, a third relay 45 including a coil 46 and a first set of normally closed contacts 47. The control module 30 also includes a relay 50 including a coil 51 and a first pair of normally closed contacts 52, a relay 55 including a coil 56 and a first set of normally open contacts 57, and a relay 60 including a coil 61 and a first set of normally open contacts 62.

An alternating current source of power is required for operation of the present system. However, since the details thereof do not form a portion of the present invention, the details have not been shown. Connections to the power source and its associated ground return are shown symbolically.

The control module 30 is connected to a series of sensors (71 to 75 inclusive) located at various points within the vessel 1 to provide status on the condition of the vapor phase heating facility. More specifically, a primary vapor sensor 71 is included in the vessel 1 near the top of the primary vapor area 5 and slightly below the primary cooling coil 4. The primary vapor sensor 71 includes a pair of normally open contacts, one contact of which is connected to the coil 56 of the relay 55. A first secondary vapor sensor 72 is provided in the vessel 1 near the top of the secondary vapor area 7 and includes a pair of normally open contacts, one contact of which is connected to the coil 41 of the relay 40. A second secondary vapor sensor 73 is included within the vessel 1 near the top of the secondary vapor area 7 and includes a pair of normally open contacts, one contact of which is connected to the coil 46 of the relay 45. A third secondary vapor sensor 74 is included within the vessel 1 above the secondary cooling coil 6 and includes a pair of normally open contacts, one contact of which is connected to the coil 51 of the relay 50. Lastly, a sensor 75 is provided within the vessel 1 and includes a pair of normally open contacts, one contact of which is connected to the coil 61 of the relay 60. The sensor 75 engages the actuator 17 of the elevator 15 when the elevator is in its "up" position to close its normally open contacts.

The coils 41, 46, 51, 56 and 61 of the relays 40, 45, 50, 55 and 60 respectively, each have one end connected to the source of power. The sensors 71, 72, 73, 74 and 75 each include one contact connected to the ground return. The high rate pump 25 and the low rate pump 26 are powered from the source of power through the control module 30 and each includes a connection to the ground return. The high rate pump 25 is energized from the source of power through the control module 30 via the series connection of the normally open contacts 62 of the relay 60, the normally open contacts 57 of the relay 55, and the normally open contacts 37 of the relay 35. The low rate pump 26 is energized from the source of power by the series connection of the normally open contacts 62 of the relay 60, the normally open contacts 57 of the relay 55, the normally closed contacts 38 of the relay 35, and the normally closed contacts 52 of the relay 50. The relay 35 includes a connection to the source of power through the normally opened contacts 62 of the relay 60 from one terminal of the coil 36. The other terminal of the coil 36 is connected to the ground return through the normally closed contacts 42 of the relay 40 and alternatively through the series connection of the normally open contacts 39 of the relay 35 in series with the normally closed contacts 47 of the relay 45.

Operation of the control module 30 and associated apparatus in accordance with the present invention may be better understood in the context of a vapor phase heating system which is being turned up from a cold start either for the first time after being assembled or being reactivated after a period during which it was shut down. In this regard, a quantity of primary fluid 3 is introduced into the vessel if not already existing from a previous period of operation. The primary liquid 3 may be pure in form or may include secondary vapor condensate 11 mixed therein. Following introduction of the primary liquid 3, power is then applied to the regulating system to energize the source of power, to energize the ground return and to energize the heating element 2. Although, an electrical type heating element is shown in the preferred embodiment it will be appreciated by those skilled in the art that other forms of heating the primary liquid 3 may be employed such as an external hot plate for example.

The sensors 71 through 74 are preferably of the temperature sensing variety and selectively arranged to exhibit an open circuit in their cold state. The sensor 75 is preferably of the position sensing variety and is arranged to exhibit an open circuit when unactivated and a closed circuit when activated. The closed circuit activated condition is achieved by action of the actuator 17 of the elevator 15 on the sensor 75 when the elevator 15 is in its "up" position.

Thus, the initial conditions at start-up are a quantity of the primary liquid 3 in the bottom of the vessel 1 which liquid may be optionally, partially diluted with the secondary vapor condensate 11 at room temperature and the temperature sensors 71 through 74 each exhibiting an open circuit with sensor 75 exhibiting a closed circuit as a result of the elevator 15 being in its "up" position.

When the source of power is energized, the open condition of the contacts of the secondary vapor sensor 72 prevents operation of the operate pump select relay 40 thus preparing an operate path for the pump selection relay 35 from the second terminal of the coil 36 to the ground return through the closed contacts 42 of the relay 40. The closed circuit of the sensor 75 as a result of the elevator 15 being in its "up" position will energize the coil 61 of the cycle disable relay 60 thus closing the normally open contacts 62. When the normally open contacts 62 of the cycle disable relay 60 operate they complete an operate path for the pump selection relay 35 from the source of power to the coil 36 thus causing the relay 35 to operate. When the pump selection relay 35 operates it closes its normally open contacts 37 to thus prepare an energizing path for the high rate dispensing pump 25. In addition, operation of the pump selection relay 35 will open the normally closed contacts 38 to prevent operation of the low rate dispensing pump 26.

The above condition will exist until the heater 2 has heated the primary liquid 3 sufficiently to boil off any secondary vapor condensate 11 which may exist therein and further, to boil off enough of the primary liquid 3 to form the blanket of primary vapor 8 filling the primary vapor area 5. At this point, the primary vapor sensor 71 will detect the presence of the built up blanket of primary vapor and present a closed circuit to the coil 56 of the low primary vapor disable relay 55 to thus operate the relay. The low primary vapor disable relay 55, in operating, will close its normally open contacts 57 thus completing a path from the source of power, through the operated normally open contacts 62 of the cycle disable relay 60, through the operated normally open contacts 57 of the low primary vapor disable relay 55, through the operated normally open contacts 37 of the pump selection relay 35 to the high rate dispensing pump 25 thus energizing the pump. The high rate dispensing pump 25, when energized, will dispense the secondary makeup fluid 21 into the vessel 1 through the conduit 28.

At this point it should be noted that the temperature dependent sensor 72 is arranged to close its contacts upon the sensing of a predetermined incomplete level of build-up of the secondary blanket 9 while the temperature dependent sensor 73 is arranged to close its contacts upon the sensing of a predetermined over build-up of the secondary blanket 9. Several means of detecting the secondary vapor conditions specified above using the sensors 72 and 73 may be implemented. For example, the temperature dependent sensors 72 and 73 may be located at the same elevation within the vessel 1 and arranged such that the first temperature dependent sensor 72 will detect a slightly lower temperature, 180° F. for example, and the second temperature dependent sensor 73 will detect a slightly higher temperature, 190° F. for example, the two sensors utilizing a temperature gradient at the top of the secondary vapor 9 which exists as a result of diffusion of the secondary blanket into the atmosphere to sense the cited predetermined secondary vapor conditions. Alternatively, the two sensors 72 and 73 may be arranged to detect the same temperature, 185° F. for example, with the first temperature dependent sensor 72 located within the vessel 1 at a slightly lower depth within the vessel 1 than the second temperature dependent sensor 73, the two sensors 72 and 73 again utilizing the temperature gradient existing at the top of the secondary vapor 9 to sense the predetermined cited conditions. While two methods of detecting the position of the top of the secondary vapor 9 have been described, it will be appreciated by those skilled in the art that other techniques which provide the same information would be equally usable with the subject invention.

Returning now to operation of the condensation heating facility of the present invention, the secondary makeup fluid 21, upon entering the vessel 1, will drop down through the secondary vapor area 7 into the primary vapor area 5 where it will absorb heat from the primary vapor and vaporize to form the blanket of secondary vapor 9. The injecting and vaporization action of the secondary makeup fluid 21 by the high rate pump 25 will continue until the blanket of secondary vapor 9 builds up to the predetermined incomplete level at which point it will activate the temperature dependent sensor 72.

The operated temperature dependent sensor 72 will cause the operate pump select relay 40 to operate and open its normally closed contacts 42 thereby opening the operate path of pump selection relay 35 however, the pump selection relay 35 will not release but instead will remain operated through a holding path including the operated normally open contacts 39 of the pump selection relay 35 and the unoperated normally closed contacts 47 of the release pump select relay 45. When the secondary blanket 7 builds up to a point, as described above, where it is sensed by the second secondary vapor sensor 73, the sensor will close its contacts thereby operating the release pump select relay 45. The release pump select relay 45, in operating, will open its normally closed contacts 47 thereby breaking the holding path of pump select relay 35 and causing the relay to release. Pump selection relay 35, in releasing, will open its operated normally open contacts 37 thereby de-energizing the high rate dispensing pump 25 and close its normally closed contacts 38 to complete an operate path for the low rate dispensing pump 26. The path to energize the low rate dispensing pump 26 may be traced from the source of power through the operated normally open contacts 62 of the cycle disable relay 60, through the operated normally open contacts 57 of the low primary vapor disable relay 55, through the nonoperated normally closed contacts 38 of the pump selection relay 35, and through the nonoperated normally closed contacts 52 of the high secondary vapor relay 50.

At this point, the low rate dispensing pump 26 will then dispense additional makeup secondary liquid 21 into the vessel 1 at an accurately controlled rate set to be vaporized to thus compensate for vapor losses from the blanket of secondary vapor 9 to the atmosphere. To achieve the accuracy and repeatability required at the rate required to make up for vapor losses to the atmosphere, it has been found necessary to employ a separate piston type pump employing temperature control of the pumped liquid to prevent density changes which would effect the fluid dispensed into the vessel 1 in a given period of time.

In the preferred embodiment of the subject invention, the low rate dispensing pump will dispense makeup secondary liquid 21 into the vessel 1 at a rate which will not permit the secondary vapor blanket 7 to grow in depth and, if anything, will only permit the secondary vapor blanket 7 to decrease in depth at a rate such that over a normal operation period, a day for example, the secondary vapor blanket 7 will not decrease to the point where the secondary vapor sensor 72 again detects absence of the secondary vapor blanket 9. It is recognized however, that such operation may not always be possible due to changes in the nature of the parts 16 which are vapor phase heated, due to the frequency at which the parts 16 are inserted into tha vapor phase heating facility, or due to misadjustments which may exist in the rate set for the low rate dispensing pump 26. To compensate for such variations, the control module of the present invention is arranged to permit the decrease in the depth of the secondary vapor 9, when sensed by the temperature sensor 72, to release the operate pump select relay 40 thereby closing its normally closed contacts 42 which will then reoperate the pump selection relay 35. The pump selection relay 35, upon operating, will operate its normally closed contacts 38 thereby de-energizing the low rate dispensing pump 26, and operate its normally open contacts 37 thereby energizing the high rate dispensing pump 25 to introduce the makeup secondary liquid 21 into the vessel 1 at a high rate to again build the secondary vapor blanket 9 up to its predetermined minimum level. The pump selection relay 35, in reoperating, additionally closes its normally open contacts 39 thereby completing a holding path for itself to the ground return through the unoperated normally closed contacts 47 of the release pump selection relay 45. When the secondary vapor blanket again rebuilds to its predetermined minimum level, the sensor 73 will again detect the presence of the blanket of secondary vapor 9 and reoperate the pump selection relay 45 as described above thus bringing the system back to its equilibrium operating point as defined above.

The control module of the subject invention additionally contains an arrangement to prevent overfilling the facility with makeup secondary liquid 21 thereby causing the secondary vapor blanket to build beyond its predetermined maximum depth and overflow the vessel 1. In this regard, the third temperature dependent sensor 74 is provided at a depth within the vessel 1 higher than the predetermined maximum depth of the secondary vapor blanket 9. Preferably, the sensor is located at a depth within the vessel above the secondary cooling coil 6 and is set to a temperature higher than the temperature settings of the first and second secondary vapor temperature dependent sensors 72 and 73 but below the setting of the primary vapor sensor 71. For example, a set point temperature of 210° F. may be selected. In the event that the secondary vapor blanket 9 builds beyond its predetermined maximum depth, as may occur when the rate selected by the low rate dispensing pump 26 is greater than needed to maintain the secondary vapor blanket 9, the sensor 74 will detect the presence of the secondary vapor 9 and close its contacts to operate the high level disable relay 50. The high level disable relay 50 in operating will operate its normally closed contacts 52 thereby disabling the low rate dispensing pump 26. This condition will exist until diffusion of the secondary vapor blanket 9 into the atmosphere causes the blanket to decrease to its predetermined maximum depth at which point the third secondary vapor sensor 74 will again sense the absence of the secondary vapor 9 and release its contacts thereby releasing the high level disable relay 50 and reclosing the relay's normally closed contacts 52 to re-energize the low rate dispensing pump 26 again.

The control module 30 further includes an arrangement to prevent dispensing makeup secondary liquid 21 into the vessel 1 when there is an insufficient quantity of the primary vapor 8. In this regard, the primary vapor sensor 71 will monitor the depth of the primary vapor 8 and upon detecting a decrease in the depth, will open its contacts thereby de-energizing the low primary vapor disable relay 55. The low primary vapor disable relay 55, in releasing, will open its normally open contacts 57 to de-energize the previously energized dispensing pump. Upon sensing again a primary vapor blanket 8 of sufficient depth, the primary vapor sensor 71 will reoperate thus reoperating the low primary vapor disable relay 55 and its normally open contacts 57. The contacts 57 in reoperating will re-energize the previously energized dispensing pump to again permit the introduction into the vessel 1 of the makeup secondary vapor liquid 21.

A normal occurrence in the cycling of a vapor phase heating facility upon the introduction of parts to be heated 16 via elevator 15 may be to cause condensation and partial collapse of the secondary vapor blanket 9 or both the secondary vapor blanket 9 and the primary vapor blanket 8, temporarily, as parts pass through the respective blankets. To prevent such temporary collapse of the blankets, which is expected, from causing the unneeded addition of the makeup secondary vapor liquid 21, the elevator detector 75 and the cycle disable relay are employed. The elevator sensor 75 is arranged to detect the "up" position of the elevator, at which position parts to be vapor phase heated are loaded and unloaded, and to close its normally open contacts and operate the cycle disable relay 60. The cycle disable relay 60, in operating, closes its normally open contacts thereby energizing the appropriate dispensing pump as described above. When the parts 16 to be vapor phase heated are loaded onto the elevator 15 and the heating cycle is started, the elevator sensor 75 will detect the elevator 15 beginning its descent into the secondary vapor and then into the primary vapor by opening its contacts. The opened contacts of sensor 75 will cause the cycle disable relay to release opening its normally open contacts 62 and thereby de-energizing the previously selected dispensing pump 25 or 26. Additionally, the normally closed contacts 62 of the cycle disable relay 60 will remove power from the pump selection relay 35 to cause it also to release. The action of the cycle disable relay 60 on the control module 30 functions to permit dispensing of the makeup secondary liquid 21 at the end of the heating cycle to begin in the maintenance dispensing mode rather than the makeup dispensing mode.

It will now be apparent that a regulating system for use in regulating the secondary vapor blanket of a condensation heating facility has been described which admits makeup secondary liquid to the facility to build up a blanket of secondary vapor only when there is sufficient heat energy stored in a primary vapor blanket to achieve such blanket buildup, to stop addition of the secondary liquid at the build-up rate when the secondary vapor blanket is built up, and to activate the maintenance addition of secondary liquid to the facility at a rate predetermined to maintain the facility at an equilibrium point, this rather than compensating for imbalances in the facility due to deviations from the equilibrium point. Also included are controls to prevent the further addition of secondary liquid when, due to changes in operating mode, the secondary vapor blanket builds to a depth beyond that allowed by the design of the facility, and also to prevent the addition of the secondary liquid 21 when there is insufficient depth of the primary vapor blanket 8. Finally, apparatus is included to temporarily suspend the addition of makeup secondary liquid 21 during a vapor phase heating cycle to thus prevent temporary depressions within the secondary vapor blanket 9 or both the primary vapor blanket 8 and the secondary vapor blanket 9, as a normal occurrence of the heating cycle, from upsetting the vapor blanket balance as a result of excessive makeup secondary liquid addition to the system.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A regulating system for use in a condensation heating facility having a vessel open to the atmosphere, said vessel including a heating means disposed in a bottom thereof and adapted to contain therein a body of hot saturated primary vapor and a blanket of secondary vapor interposed between the atmosphere and the primary vapor, said blanket of secondary vapor subject to loss through dispersion to the atmosphere, said control system comprising:

a reservoir of secondary liquid;

sensing means included within said vessel;

first dispensing means connected between said reservoir and said vessel, said first dispensing means including a first pump operated to dispense said secondary liquid at a first predetermined rate which is influenced by variations in atmospheric temperature and in the alternative by variations in electrical power supplied to said pump to said vessel to establish said blanket of secondary vapor;

second dispensing means connected between said reservoir and said vessel, said second dispensing means including a second pump operated to dispense said secondary liquid at a second predetermined rate which is not influenced by variations in atmospheric temperature and in the alternative and also not influenced by variations in electrical power supplied to said pump to said vessel to maintain said blanket of secondary vapor; and control means connected to said first dispensing means, to said second dispensing means, and to said sensing means, said control means operated in response to a first condition of said secondary vapor detected by said sensing means to energize said first dispensing means and alternatively operated in response to a second condition of said secondary vapor detected by said sensing means to energize said second dispensing means.

2. A regulating system as claimed in claim 1, wherein: said second dispensing means predetermined rate is lower than said first dispensing means predetermined rate.

3. A regulating system as claimed in claim 1, wherein: said first dispensing means includes a pump, said second dispensing means includes a pump, said regulating system further includes a first conduit means, between said reservoir and said pumps and a second conduit means between said pumps and said vessel.

4. A regulating system as claimed in claim 1, wherein: said regulating system further includes a first and a second temperature dependent sensor, said first sensor located at a first location within said vessel, connected to said control means, and nonoperative in response to the sensing of said first condition of said secondary vapor and said second temperature dependent sensor located at a second location within said vessel, connected to said control means, and operative in response to the sensing of said second condition of said secondary vapor.

5. A regulating system as claimed in claim 1, wherein: said control means includes pump selection means connected to said first dispensing means, said second dispensing means, and said sensing means, said pump selection means initially operative to energize said first dispensing means.

6. A regulating system as claimed in claim 5, wherein: said pump selection means includes a first switching means connected to said first dispensing means and to said second dispensing means, said first switching means initially operated to energize said high rate dispensing means.

7. A regulating system as claimed in claim 6, wherein: said pump selection means includes a second switching means connected to said sensing means and to said first switching means, said second switching means operated in response to said sensing means to condition said first switching means for release.

8. A regulating system as claimed in claim 7, wherein: said pump selection means includes a third switching means connected to said sensing means and to said first switching means, said third switching means operated in response to said sensing means to release said first switching means, said first dispensing means thus rendered nonoperative and said second dispensing means thus rendered operative.

9. A regulating system as claimed in claim 8, wherein: said first switching means, said second switching means, and said third switching means comprise first, second and third relays respectively.

10. A regulating system as claimed in claim 9, wherein: said sensing means including a first sensor connected to said second relay and a second sensor connected to said third relay.

11. A regulating system as claimed in claim 5, wherein: said control means includes a secondary vapor overflow prevention means connected to said sensing means and to said second dispensing means, said overflow prevention means operated in response to said sensing means to render said second dispensing means nonoperative.

12. A regulating system as claimed in claim 11, wherein: said overflow prevention means comprises an overflow prevention relay and said sensing means includes an overflow prevention sensor connected to said fourth relay.

13. A regulating system as claimed in claim 5, wherein: said control means includes a low primary vapor disabling means connected to said sensing means and including connections to said first dispensing means and to said second dispensing means, said primary vapor disabling means operative in response to said sensing means to condition said dispensing means to become operative.

14. A regulating system as claimed in claim 13, wherein: said low primary vapor disabling means comprises a low primary vapor disabling relay and said sensing means includes a low primary vapor disabling sensor connected to said low primary vapor disabling relay.

15. A regulating system as claimed in claim 5, wherein: said control means includes system cycle disable means normally operated and connected to said pump selection means and to said sensing means, said system cycle disable means nonoperative in response to said sensing means sensing a cycling condition of said facility to disable said pump selection means, said system cycle disable means operative in response to said sensing means sensing a noncycling condition of said facility to enable said pump selection means.

16. A regulating system as claimed in claim 15, wherein: said system disable means comprises a system cycle disable relay and said sensing comprises a system cycle disable sensor connected to said system cycle disable relay.

* * * * *